(12) United States Patent
Bjerke et al.

(10) Patent No.: US 8,488,712 B2
(45) Date of Patent: Jul. 16, 2013

(54) SYSTEMS AND METHODS FOR ENHANCED CHANNEL ESTIMATION IN WIRELESS COMMUNICATION SYSTEMS

(75) Inventors: Bjorn Bjerke, Concord, MA (US); Steven J Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/310,558

(22) Filed: Dec. 2, 2011

(65) Prior Publication Data

US 2012/0147984 A1  Jun. 14, 2012

Related U.S. Application Data

(63) Continuation of application No. 11/965,655, filed on Dec. 27, 2007, now Pat. No. 8,085,873.

(60) Provisional application No. 60/883,090, filed on Jan. 2, 2007.

(51) Int. Cl.
*H04L 1/02* (2006.01)
*H04L 27/00* (2006.01)

(52) U.S. Cl.
USPC .......................................... 375/267; 375/316

(58) Field of Classification Search
USPC .. 375/267, 260, 316, 341, 347, 349; 370/206, 370/210; 455/60
See application file for complete search history.

(56) References Cited

U.S. PATENT DOCUMENTS

| | | | |
|---|---|---|---|
| 5,363,412 A | 11/1994 | Love et al. | |
| 5,796,814 A | 8/1998 | Brajal et al. | |
| 5,912,876 A | 6/1999 | H'mimy | |
| 6,298,035 B1 | 10/2001 | Heiskala | |
| 6,795,427 B1 | 9/2004 | Klein et al. | |
| 7,161,896 B1 | 1/2007 | Hart et al. | |
| 7,855,948 B2 * | 12/2010 | Anikhindi et al. | 370/208 |

(Continued)

FOREIGN PATENT DOCUMENTS

| | | |
|---|---|---|
| CN | 1308417 A | 8/2001 |
| CN | 1801792 A | 7/2006 |

(Continued)

OTHER PUBLICATIONS

Alexopoulos K et al: "DMT Time Domain Equalization Based on ARMA Models" Proceedings of the IEEE International Conference on Acoustics, Speech and Signal Processing, Toulouse, France, May 14-19, 2006, pp. IV-113 to IV-116.

(Continued)

*Primary Examiner* — Khai Tran
(74) *Attorney, Agent, or Firm* — QUALCOMM Patent Group; James Hunt Yancey, Jr.

(57) ABSTRACT

Methods and apparatus for enhancing estimations of channel response in a wireless communication system are discussed. As an example, a method can comprise: selecting a selected channel from among one or more channels in the communication system; determining, for the selected channel, an initial channel estimate comprising a sequence of frequency-domain samples; determining a phase slope of the initial channel estimate; generating a flat-phase channel estimate by removing the phase slope from the initial channel estimate; and generating an enhanced channel estimate for the selected channel by applying a smoothing function to the flat-phase channel estimate. Other aspects, embodiments, and features are also claimed and described.

40 Claims, 7 Drawing Sheets

U.S. PATENT DOCUMENTS

| | | | |
|---|---|---|---|
| 8,085,873 B2 | 12/2011 | Bjerke et al. | |
| 2003/0058951 A1* | 3/2003 | Thomson et al. | 375/260 |
| 2005/0254589 A1 | 11/2005 | Higuchi et al. | |
| 2006/0239339 A1 | 10/2006 | Brown et al. | |
| 2007/0014272 A1 | 1/2007 | Palanki et al. | |

FOREIGN PATENT DOCUMENTS

| | | |
|---|---|---|
| EP | 1661344 A2 | 5/2006 |
| JP | 08340315 | 12/1996 |
| JP | 2005223575 | 8/2005 |
| JP | 2005328312 A | 11/2005 |
| KR | 20060015295 A | 2/2006 |
| RU | 2235430 | 8/2004 |
| WO | WO2006071760 | 7/2006 |
| WO | WO2006138206 A1 | 12/2006 |

OTHER PUBLICATIONS

Den Eire L. et al: "A low-complexity ML Channel estimator for OFDM" IEEE Transactions on Communications, vol. 51, No. 2, Feb. 1, 2003, pp. 135-140.

Hsieh M-H. et al: "Channel Estimation for OFDM Systems Based on Comb-Type Pilot Arrangement in Frequency Selective Fading Channels" IEEE Transactions on Consumer Electronics, vol. '44, No. 1, Feb. 1, 1998, pp. 217-225.

IEEE 802.11n/D2.00, Draft Standard for Information Technology, "Part 11:Wireless LAN Medium Access Control (MAC) and Physical Layer (PHY) specifications: Amendment <number>: Enhancements for Higher Throughput", Feb. 2007.

International Search Report—PCT/US08/050011—International Search Authority, European Patent Office—Jul. 7, 2008.

Jihyung Kim et al: "Enhanced Channel Estimation for Comb-type Pilot-aided OFDM systems" Proceedings of th~ IEEE Symposium on Personal, Indoor and Mobile Radio Communications, Berlin, Germany, Sep. 11-14, 2005, vol. 4, Sep. 11, 2005, pp. 2481-2483.

Kay S.M.: "Fundamentals of Statistical Signal Processing: Estimation Theory" Jan. 1, 1993 Prentice-Hall, Inc., Example 7.4 and Example 8.1, pp. 162-220.

Morelli M. et al.: "A Comparison of Pilot-Aided Channel Estimation Methods for OFDM Systems" IEEE Transactions on Signal Processing, vol. 49, No. 12, Dec. 1, 2001, pp. 3065-3073.

Written Opinion—PCT/US08/050011—International Search Authority, European Patent Office—Jul. 7, 2008.

Xia Chen et al: "A Low Complexity Pilot-Aided Channel Estimation Resisting Residual Timing Errors for OFDM Systems" Proceedings of the IEEE Symposium on Personal, Indoor and Mobile Radio Communications, Athens, Greece, Sep. 3-7, 2007, pp. 1-5.

Taiwan Search Report—TW097100086—TIPO—Aug. 5, 2011.

* cited by examiner

SYSTEMS AND METHODS FOR ENHANCED CHANNEL ESTIMATION IN WIRELESS COMMUNICATION SYSTEMS

PRIORITY CLAIM & CROSS REFERENCE TO RELATED APPLICATIONS

This application is a continuation of U.S. application Ser. No. 11/965,655, having the same title as this application, and filed on 27 Dec. 2007, which claims priority to Provisional Application No. 60/883,090 entitled "Method for Enhanced Channel Estimation in Wireless Communication Systems," filed Jan. 2, 2007. All of said applications are assigned to the assignee hereof and are expressly incorporated by reference herein in their full entireties as if fully set forth below.

TECHNICAL FIELD

This disclosure relates to the field of multiplexed communications, and more particularly to systems and methods for improving the performance of multiple-input multiple-output ("MIMO") systems by enhancing channel estimation.

BACKGROUND

The IEEE 802.11n standard for wireless communications, expected to be finalized in late 2008, incorporates multiple-input multiple-output (MIMO) multiplexing into the orthogonal frequency-division multiplexing (OFDM) technology adopted by previous versions of the 802.11 standard. MIMO systems have the advantage of considerably enhanced throughput and/or increased reliability compared to non-multiplexed systems.

Rather than sending a single serialized data stream from a single transmitting antenna to a single receiving antenna, a MIMO system divides the data stream into multiple streams which are modulated and transmitted in parallel at the same time in the same frequency channel, for example by multiple transmitting antennas. At the receiving end, one or more MIMO receiver antenna chains receives a linear combination of the multiple transmitted data streams, determined by the multiple paths that can be taken by each separate transmission. The data streams are then processed, as described in more detail below.

In general, a MIMO system employs multiple transmit antennas and multiple receive antennas for data transmission. A MIMO channel formed by the $N_T$ transmit and $N_R$ receive antennas can support up to NS datastreams, where $N_S \leq \min\{N_T, N_R\}$.

In a wireless communication system, data to be transmitted is first modulated onto a radio frequency (RF) carrier signal to generate an RF modulated signal that is more suitable for transmission over a wireless channel. In general, for a MIMO system, up to $N_T$ RF modulated signals may be generated and transmitted simultaneously from the $N_T$ transmit antennas. The transmitted RF modulated signals may reach the $N_R$ receive antennas via a number of propagation paths in the wireless channel. The relationship of the received signals to the transmitted signals may be described as follows:

$$y_k = H_k T[s_k] + n_k, \quad k=0, 1, \ldots, N_f-1 \quad \text{(Eq. 1)}$$

where the index k identifies the subcarrier and $N_f$ is the number of subcarriers; $y_k$ is a complex vector of $N_R$ components corresponding to the signals received at each of the $N_R$ receive antennas; $s_k$ is the symbol vector representing the source data stream; $H_k$ is a $N_R \times N_T$ matrix whose components represent the complex gain of the channel; and $n_k$ is a vector representing the noise received at each receiving antenna. $T[s_k]$ represents the transmitter spatial processing that maps the symbol vector $s_k$ onto the $N_T$ transmit antennas. (In the discussions herein, the following notational conventions are used, unless otherwise specified: bold capital letters represent matrices; bold lowercase letters represent vectors; and italicized letters represent scalar quantities.)

The characteristics of the propagation paths typically vary over time due to a number of factors such as, for example, fading, multipath, and external interference. Consequently, the transmitted RF modulated signals may experience different channel conditions (e.g., different fading and multipath effects) and may be associated with different complex gains and signal-to-noise ratios (SNRs). In equation (1), these characteristics are encoded in channel response matrix $H_k$.

To achieve high performance, it is often necessary to characterize the response $H_k$ of the wireless channel. The response of the channel may be described by parameters such as spectral noise, signal-to-noise ratio, bit rate, or other performance parameters. The transmitter may need to know the channel response, for example, in order to perform spatial processing for data transmission to the receiver as described below. Similarly, the receiver may need to know the channel response to perform spatial processing on the received signals to recover the transmitted data.

SUMMARY OF EXEMPLARY EMBODIMENTS

Disclosed herein are methods and apparatus for enhancing the estimation of channel response in a wireless communication system. In one embodiment, a method of optimized channel estimation in a communication system includes selecting a selected channel from among one or more channels in the communication system; determining, for the selected channel, an initial channel estimate; transforming the initial channel estimate into an initial time domain impulse response estimate comprising a sequence of samples; selecting a sub-sequence of samples from the sequence of samples; generating a truncated time domain impulse response estimate by setting to zero the samples in the initial time domain impulse response estimate that are not in the selected sub-sequence of samples; computing a time domain weighted impulse response estimate using the truncated time domain impulse response estimate for the selected channel; and computing a maximum likelihood channel estimate for the selected channel by transforming the time domain weighted impulse response estimate into the frequency domain. In a variation, selecting the sub-sequence of samples further includes determining a channel response duration; and selecting as the sub-sequence of samples an optimized sequence of samples from the initial time domain impulse response estimate, wherein the optimized sequence of samples has a duration equal to the channel response duration and is selected to maximize the energy in the optimized sequence of samples. In a further variation, determining the channel response duration further includes receiving the channel response duration as an input. In yet a further variation, determining the channel response duration further includes selecting the channel response duration from a set of predefined values. In yet a further variation, selecting the channel response duration from a set of predefined duration values further includes for each value in the set of predefined values, finding an optimized sub-sequence, wherein the optimized sub-sequence is a sub-sequence of duration equal to that value, the optimized sub-sequence being selected to maximize the sum of the energies of all samples within that sub-sequence whose energy exceeds a threshold; and selecting as the channel response duration a value from the set of predefined values whose corresponding optimized sub-sequence has the highest energy. In yet a further variation, the selected value is the smallest value whose corresponding optimized sub-sequence has the highest energy. In yet a further variation, the method further includes applying a cyclic shift to the maximum likelihood channel estimate. In yet a further variation, the communication system includes one or more sending antennas. In yet a further variation, the communication system includes one or more receiving antennas. In yet a further variation, each channel in the communication system corresponds to a send-receive pair of one of the sending antennas and one of the receiving antennas, the method further comprising repeating, for each channel in the communication system, all steps from selecting a selected channel to computing a maximum likelihood channel estimate for the selected channel. In yet a further variation, each channel in the communication system corresponds to a stream-receive pair of one of a plurality of data streams and one of the receiving antennas, the method further comprising repeating, for each channel in the communication system, all steps from selecting a selected channel to computing a maximum likelihood channel estimate for the selected channel.

In a further embodiment, an apparatus for optimizing channel estimation in a communication system includes a receiving antenna; a receiver adapted to receive a signal from the receiving antenna; an initial channel estimator module adapted to select a selected channel from among one or more channels in the communication system and to determine, for the selected channel, an initial channel estimate based upon the received signal; a transformation module adapted to transform the initial channel estimate into an initial impulse response estimate comprising a sequence of samples; a filtering module adapted to select a sub-sequence of samples from the sequence of samples and generate a truncated initial impulse response estimate by setting to zero the samples in the initial impulse response estimate that are not in the selected sub-sequence of samples; and a maximum likelihood channel estimating module adapted to compute a time domain weighted impulse response estimate using the truncated time domain impulse response estimate for the selected channel and to compute a maximum likelihood channel estimate for the selected channel by transforming the time domain weighted impulse response estimate into the frequency domain. In a variation, the filtering module is further adapted to determine a channel response duration and select as the sub-sequence of samples an optimized sequence of samples from the initial time domain impulse response estimate, wherein the optimized sequence of samples has a duration equal to the channel response duration and is selected to maximize the energy in the optimized sequence of samples. In a further variation, the filtering module is further adapted to receive the channel response duration as an input. In yet a further variation, the filtering module is further adapted to select the channel response duration from a set of predefined values. In yet a further variation, the filtering module is adapted to find, for each value in the set of predefined values, an optimized sub-sequence, wherein the optimized sub-sequence is a sub-sequence of duration equal to that value, the optimized sub-sequence selected to maximize the sum of the energies of all samples within that sub-sequence whose energy exceeds a threshold; and to select as the channel response duration a value from the set of predefined values whose corresponding optimized sub-sequence has the highest energy. In yet a further variation, the selected value is the smallest value whose corresponding optimized sub-sequence has the highest energy. In yet a further variation, the receiving antenna is one of a plurality of receiving antennas. In yet a further variation, each channel in the communication system corresponds to a send-receive pair of a sending antenna and the receiving antenna. In yet a further variation, each channel in the communication system corresponds to a stream-receive pair of a data stream and the receiving antenna.

In yet a further embodiment, a machine-readable medium carrying instructions for carrying out a method of optimizing channel estimation in a communication system includes selecting a selected channel from among one or more channels in the communication system; determining, for the selected channel, an initial channel estimate; transforming the initial channel estimate into an initial time domain impulse response estimate comprising a sequence of samples; selecting a sub-sequence of samples from the sequence of samples; generating a truncated time domain impulse response estimate by setting to zero the samples in the initial time domain impulse response estimate that are not in the selected sub-sequence of samples; computing a time domain weighted impulse response estimate using the truncated time domain impulse response estimate for the selected channel; and computing a maximum likelihood channel estimate for the selected channel by transforming the time domain weighted impulse response estimate into the frequency domain. In a variation, selecting the sub-sequence of samples further includes determining a channel response duration; and selecting as the sub-sequence of samples an optimized sequence of samples from the initial time domain impulse response estimate, wherein the optimized sequence of samples has a duration equal to the channel response duration and is selected to maximize the energy in the optimized sequence of samples. In a further variation, determining the channel response duration further includes receiving the channel response duration as an input. In yet a further variation, determining the channel response duration further includes selecting the channel response duration from a set of predefined values. In yet a further variation, selecting the channel response duration from a set of predefined duration values further includes for each value in the set of predefined values, finding an optimized sub-sequence, wherein the optimized sub-sequence is a sub-sequence of duration equal to that value, the optimized sub-sequence being selected to maximize the sum of the energies of all samples within that sub-sequence whose energy exceeds a threshold; and selecting as the channel response duration a value from the set of predefined values whose corresponding optimized sub-sequence has the highest energy. In yet a further variation, the selected value is the smallest value whose corresponding optimized sub-sequence has the highest energy. In yet a further variation, the method further includes applying a cyclic shift to the maximum likelihood channel estimate. In yet a further variation, the communication system includes one or more sending antennas. In yet a further variation, the communication system includes one or more receiving antennas. In yet a further variation, each channel in the communication system corresponds to a send-receive pair of one of the sending antennas and one of the receiving antennas, and the method further comprises repeating, for each channel in the communication system, all steps from selecting a selected channel to computing a maximum likelihood channel estimate for the selected channel. In yet a further variation, each channel in the communication system corresponds to a stream-receive pair of one of a plurality of data streams and one of the receiving antennas, and wherein the method further comprises repeating, for each channel in the communication system, all steps from selecting a selected channel to computing a maximum likelihood channel estimate for the selected channel.

In yet another embodiment, a method of enhanced channel estimation in a communication system includes selecting a selected channel from among one or more channels in the communication system; determining, for the selected channel, an initial channel estimate comprising a sequence of frequency-domain samples; determining a phase slope of the initial channel estimate; generating a flat-phase channel estimate by removing the phase slope from the initial channel estimate; and generating an enhanced channel estimate for the selected channel by applying a smoothing function to the flat-phase channel estimate. In a variation, determining the phase slope of the initial channel estimate includes determining an average phase slope over the sequence of frequency-domain samples in the initial channel estimate. In another variation, determining the phase slope of the initial channel estimate includes determining an average phase slope for every channel in the communication system, each channel comprising a pair of one of the at least one sending antennas and one of the at least one receiving antennas. In yet another variation, applying a smoothing function to the flat-phase channel estimate further includes computing a weighted average of a predetermined number of adjacent samples from the sequence of frequency-domain samples. In yet another variation, the weighted average is computed according to the formulae:

$$H_{sm,\varphi}(k) = A_{-\frac{N+1}{2}} \cdot H_\varphi\left(k - \left(\frac{N-1}{2}\right)\right) +$$
$$\ldots + A_0 \cdot H_\varphi(0) + \ldots + A_{\frac{N-1}{2}} \cdot H_\varphi\left(k + \left(\frac{N-1}{2}\right)\right)$$
$$k = \frac{N-1}{2}, \ldots, N_f - \left(\frac{N-1}{2}\right) - 1$$

wherein $H_\varphi(k)$ is a $k^{th}$ sample of the sequence of frequency-domain samples in the flat-phase channel estimate, $H_{sm,\varphi}(k)$ is the weighted average value corresponding to the $k^{th}$ sample, N is the predetermined number of samples in the weighted average, $N_f$ is the total number of samples in the flat-phase channel estimate, and $A_i$ are weighting coefficients. In yet a further variation, N=3, $A_{-1}$=0.25, $A_0$=0.5, and $A_1$=0.25. In yet a further variation, generating an enhanced channel estimate further includes restoring the phase slope to the enhanced channel estimate. In yet another variation, generating an enhanced channel estimate further includes inserting a cyclic shift into the channel estimate. In yet another variation, the method includes applying a cyclic shift to the maximum likelihood channel estimate. In yet another variation, the communication system includes one or more sending antennas. In yet another variation, the communication system includes one or more receiving antennas. In yet another variation, each channel in the communication system corresponds to a send-receive pair of one of the sending antennas and one of the receiving antennas, the method further comprising repeating, for each channel in the communication system, all steps from selecting a selected channel to generating an enhanced channel estimate for the selected channel. In yet another variation, each channel in the communication system corresponds to a stream-receive pair of one of a plurality of data streams and one of the receiving antennas, the method further comprising repeating, for each channel in the communication system, all steps from selecting a selected channel to generating an enhanced channel estimate for the selected channel.

In yet another embodiment, an apparatus for enhancing channel estimation in a communication system includes a receiving antenna; a receiver adapted to receive a signal from the receiving antenna; an initial channel estimator module adapted to select a channel corresponding to the receiving antenna and one of at least one sending antennas and to determine, for the selected channel, an initial channel estimate based upon the received signal, the initial channel estimate comprising a sequence of frequency-domain samples; a phase-modifying module adapted to determine a phase slope of the initial channel estimate and to generate a flat-phase channel estimate by removing the phase slope from the initial channel estimate; and a smoothing module adapted to generate an enhanced channel estimate for the selected channel by applying a smoothing function to the flat-phase channel estimate. In a variation, the phase-modifying module is further adapted to determine the phase slope of the initial channel estimate by determining an average phase slope over the sequence of frequency-domain samples in the initial channel estimate. In another variation, the phase-modifying module is further adapted to determine the phase slope of the initial channel estimate by determining an average phase slope for every channel in the communication system, each channel comprising a pair of one of the at least one sending antennas and one of the at least one receiving antennas. In yet another variation, the smoothing module is further adapted to compute a weighted average of a predetermined number of adjacent samples from the sequence of frequency-domain samples. In yet a further variation, the weighted average is computed according to the formulae $$H_{sm,\varphi}(k) = A_{-\frac{N+1}{2}} \cdot H_\varphi\left(k - \left(\frac{N-1}{2}\right)\right) +$$
$$\ldots + A_0 \cdot H_\varphi(0) + \ldots + A_{\frac{N-1}{2}} \cdot H_\varphi\left(k + \left(\frac{N-1}{2}\right)\right)$$
$$k = \frac{N-1}{2}, \ldots, N_f - \left(\frac{N-1}{2}\right) - 1$$

wherein $H_\varphi(k)$ is a $k^{th}$ sample of the sequence of frequency-domain samples in the flat-phase channel estimate, $H_{sm,\varphi}(k)$ is the weighted average value corresponding to the $k^{th}$ sample, N is the predetermined number of samples in the weighted average, $N_f$ is the total number of samples in the flat-phase channel estimate, and $A_i$ are weighting coefficients. In yet a further variation, N=3, $A_{-1}$=0.25, $A_0$=0.5, and $A_1$=0.25. In yet a further variation, the apparatus further includes a phase restoring module adapted to restore the phase slope to the enhanced channel estimate. In yet a further variation, the apparatus further includes a shifting module adapted to insert a cyclic shift into the channel estimate. In yet a further variation, the receiving antenna is one of a plurality of receiving antennas. In yet another variation, each channel in the communication system corresponds to a send-receive pair of a sending antenna and the receiving antenna. In yet another variation, each channel in the communication system corresponds to a stream-receive pair of a data stream and the receiving antenna.

In yet another embodiment, a machine-readable medium carrying instructions for carrying out a method of enhanced channel estimation in a communication system includes selecting a selected channel from among one or more channels in the communication system; determining, for the selected channel, an initial channel estimate comprising a sequence of frequency-domain samples; determining a phase slope of the initial channel estimate; generating a flat-phase channel estimate by removing the phase slope from the initial channel estimate; and generating an enhanced channel estimate for the selected channel by applying a smoothing function to the flat-phase channel estimate. In a variation, determining the phase slope of the initial channel estimate comprises determining an average phase slope over the sequence of frequency-domain samples in the initial channel estimate. In another variation, determining the phase slope of the initial channel estimate includes determining an average phase slope for every channel in the communication system, each channel comprising a pair of one of the at least one sending antennas and one of the at least one receiving antennas. In yet another variation, applying a smoothing function to the flat-phase channel estimate further includes computing a weighted average of a predetermined number of adjacent samples from the sequence of samples. In yet a further variation, the weighted average is computed according to the formulae $$H_{sm,\varphi}(k) = A_{\frac{-N+1}{2}} \cdot H_\varphi\left(k - \left(\frac{N-1}{2}\right)\right) + $$
$$\ldots + A_0 \cdot H_\varphi(0) + \ldots + A_{\frac{N-1}{2}} \cdot H_\varphi\left(k + \left(\frac{N-1}{2}\right)\right)$$
$$k = \frac{N-1}{2}, \ldots, N_f - \left(\frac{N-1}{2}\right) - 1$$

wherein $H_\varphi(k)$ is a $k^{th}$ sample of the sequence of frequency-domain samples in the flat-phase channel estimate, $H_{sm,\varphi}(k)$ is the weighted average value corresponding to the $k_{th}$ sample, N is the predetermined number of samples in the weighted average, $N_f$ is the total number of samples in the flat-phase channel estimate, and $A_i$ are weighting coefficients. In yet a further variation, N=3, $A_{-1}$=0.25, $A_0$=0.5, and $A_1$=0.25. In yet another variation, generating an enhanced channel estimate further includes restoring the phase slope to the enhanced channel estimate. In yet another variation, generating an enhanced channel estimate further includes inserting a cyclic shift into the channel estimate. In yet another variation, the communication system includes one or more sending antennas. In yet a further variation, the communication system includes one or more receiving antennas. In yet a further variation, each channel in the communication system corresponds to a send-receive pair of one of the sending antennas and one of the receiving antennas, and the method further includes repeating, for each channel in the communication system, all steps from selecting a selected channel to generating an enhanced channel estimate for the selected channel. In yet a further variation, each channel in the communication system corresponds to a stream-receive pair of one of a plurality of data streams and one of the receiving antennas, and the method further includes repeating, for each channel in the communication system, all steps from selecting a selected channel to generating an enhanced channel estimate for the selected channel.

BRIEF DESCRIPTION OF THE DRAWINGS

Exemplary embodiments of systems and methods according to the present invention will be understood with reference to the accompanying drawings, which are not intended to be drawn to scale. In the drawings, each identical or nearly identical component that is illustrated in various figures is represented by a like designator. For purposes of clarity, not every component may be labeled in every drawing. In the drawings.

The features and nature of the present invention will become more apparent from the detailed description set forth below when taken in conjunction with the drawings in which like reference characters identify correspondingly throughout.

DETAILED DESCRIPTION

Figure 1:
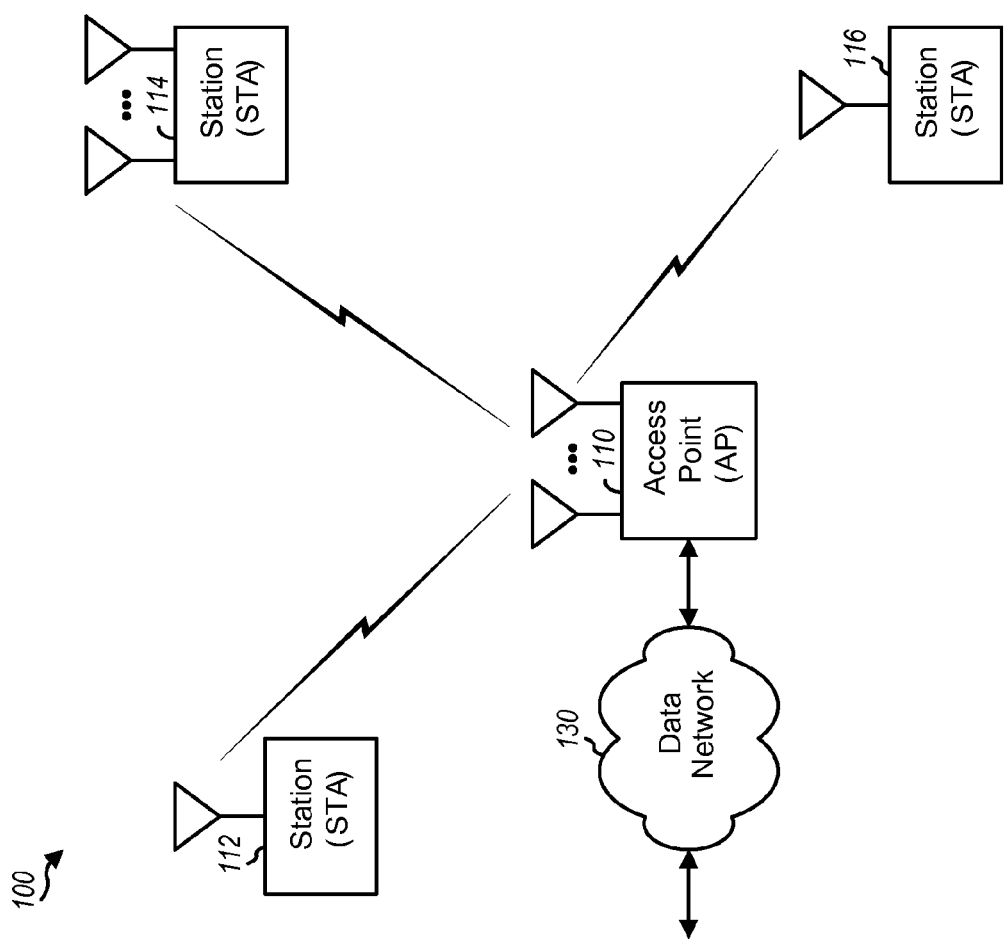
FIG. 1 is a schematic diagram of an exemplary wireless network.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items. The word "exemplary" is used herein to mean "serving as an example, instance, or illustration." Any embodiment or design described herein as "exemplary" is not necessarily to be construed as preferred or advantageous over other embodiments or designs.

Exemplary MIMO System

FIG. 1 shows an exemplary wireless network 100 with an access point (AP) 110 and one or more stations (STA) 120. Access point 110 is generally a station, for example a fixed station, that communicates with the stations, such as a base station or a base transceiver subsystem (BTS), a node, or other access point. Access point 110 may couple to a data network 130 and may communicate with other devices via data network 130.

The stations 120 may be any device that can communicate with another station via a wireless medium. A station may also be called, and may contain some or all of the functionality of: a terminal, an access terminal, a user terminal, a mobile station, a mobile, a remote station, a user equipment, a user device, a user agent, a subscriber station, a subscriber unit, or other similar devices. In exemplary embodiments a station is one or more of a cellular phone, a cordless phone, a Session Initiation Protocol (SIP) phone, a wireless local loop (WLL) station, a handheld device, a wireless device, a personal digital assistant (PDA), a laptop computer, a computing device, a wireless modem card, a media device (e.g., an HDTV, a DVD player, a wireless speaker, a camera, a camcorder, a webcam, etc.), or other user device. The stations 120 may communicate with the access point 110. Alternatively, a station 120 may also communicate peer-to-peer with another station 120. Either way, any station 120 may include or may function as a transmitter, a receiver, or both.

In an exemplary embodiment, access point 110 is a wireless network hub and the stations 120 are one or more computers equipped with wireless network adapters. In an alternative exemplary embodiment, access point 110 is a cellular communication station and stations 120 are one or more cellular telephones, pagers, or other communication devices. Persons skilled in the art will recognize other systems that can be represented generally as illustrated in FIG. 1.

The access point 110 may be equipped with a single antenna 112 or multiple antennas 112 for data transmission and reception. Similarly, each station 120 may also be equipped with a single antenna 112 or multiple antennas 112 for data transmission and reception. In the exemplary embodiment illustrated in FIG. 1, access point 110 is equipped with multiple (e.g., two or four) antennas 112, stations 120a and 120b are each equipped with a single antenna 112, and station 120c is equipped with multiple antennas 112. In general any number of antennas 112 may be used; it is not necessary that the stations 120 have the same number of antennas 112 as one another or that they have the same number of antennas 112 as the access point 110.

Figure 2:
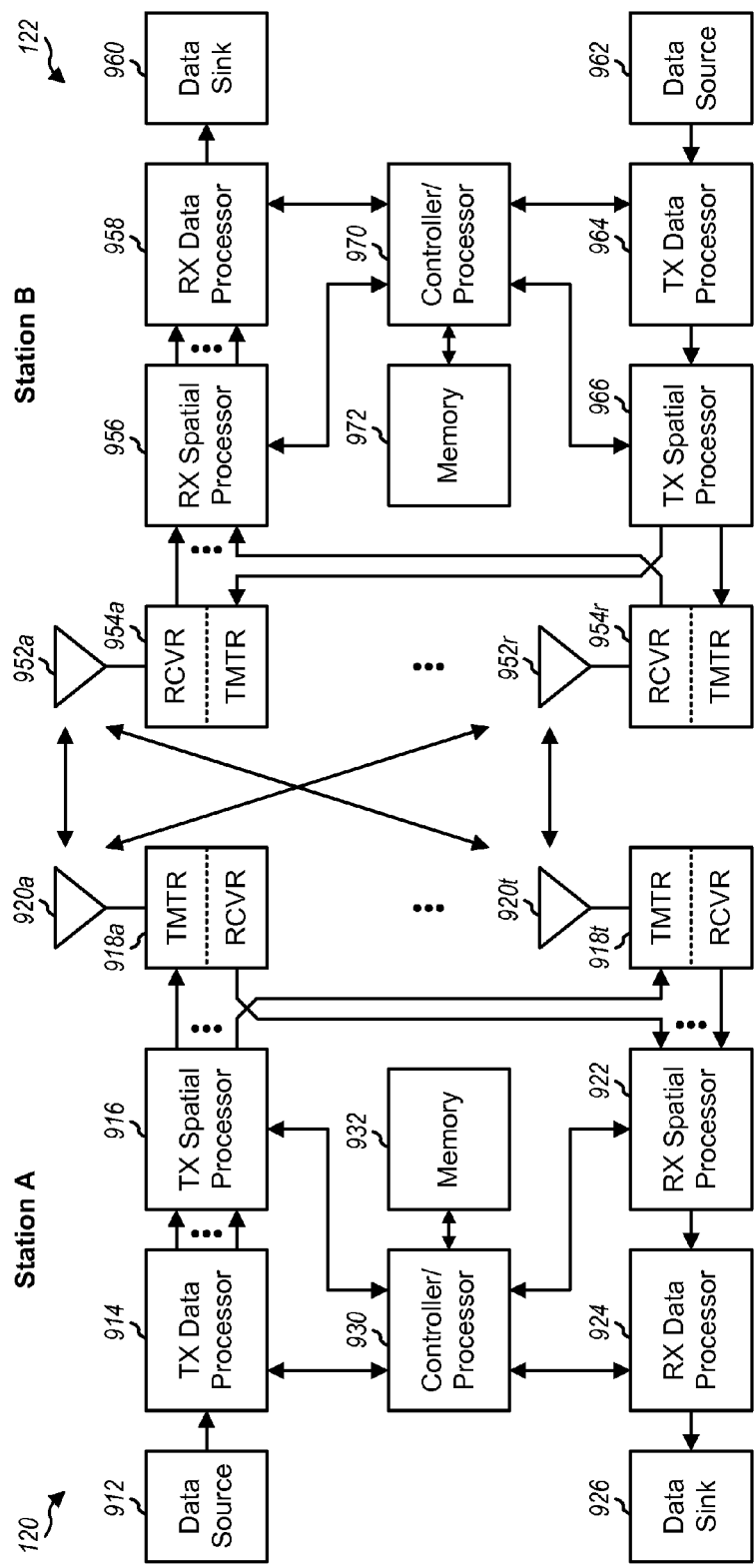
FIG. 2 is a block diagram of an exemplary transmitting station and a receiving station.

FIG. 2 shows a block diagram of stations 120 and 122 (station 120 in FIG. 1). Station 120 is equipped with $N_T$ antennas 920a . . . t, and station 122 is equipped with $N_R$ antennas 952a . . . r. Each antenna may be either a physical antenna or an antenna array.

In an exemplary embodiment, at station 120, a transmit (TX) data processor 914 receives traffic data from a data source 912 and other data from a controller 930. The received data may include encoded raw data of any kind, such as voice data, video data, or any other data that may be transmitted over a wireless network. TX data processor 914 processes (e.g., formats, encodes, interleaves, and symbol maps) the data and generates data symbols. A TX spatial processor 916 multiplexes pilot symbols with the data symbols, performs transmitter spatial processing on the multiplexed data symbols and pilot symbols, and provides up to $N_T$ output symbol streams for up to t transmitters (TMTR) 918a . . . t. Each transmitter 918 processes (e.g., modulates, converts to analog, filters, amplifies, and upconverts) its output symbol stream and generates a modulated signal. Up to $N_T$ modulated signals from the transmitters 918a . . . t are transmitted from antennas 920a . . . t, respectively.

In an exemplary embodiment, at station 122, $N_R$ antennas 952a . . . r receive the modulated signals from station 120, and each antenna 952 provides a received signal to a respective receiver (RCVR) 954a . . . r. Each receiver 954 processes (e.g., filters, amplifies, downconverts, digitizes, and demodulates) its received signal and provides received symbols. A receive (RX) spatial processor 956 performs detection on the received symbols and provides data symbol estimates. An RX data processor 958 further processes (e.g., deinterleaves and decodes) the data symbol estimates and provides decoded data to a data sink 960.

For transmission in the other direction—from station 122 to station 120—at station 122, traffic data from a data source 962 and other data from a controller 970 are processed by a TX data processor 964, multiplexed with pilot symbols and spatially processed by a TX spatial processor 966, and further processed by the up to $N_R$ transmitters 954a . . . r to generate up to $N_R$ modulated signals, which are transmitted via antennas 952a . . . r. At station 120, the modulated signals from station 122 are received by the $N_T$ antennas 920a . . . t, processed by the up to $N_T$ receivers 918a . . . t, spatially processed by an RX spatial processor 922, and further processed by an RX data processor 924 to recover the data sent by station 122.

Controllers/processors 930 and 970 control the operation at stations 120 and 122, respectively. Memories 932 and 972 store data and program codes for stations 120 and 122, respectively.

MIMO-OFDM Signals.

As noted above, in a MIMO-OFDM system with $N_T$ transmit antennas and $N_R$ receive antennas the equivalent baseband received signal may be represented (in subcarrier k) by $$y_k = H_k T[s_k] + n_k, k=0, 1, \ldots, N_f-1 \quad \text{(Eq. 1)}$$

where $y_k$ is the $N_R$-element receive vector, $H_k$ is the $N_R \times N_T$ MIMO channel matrix, $n_k$ is an $N_R$-element additive white Gaussian noise (AWGN) vector, and $T[s_k]$ is a transformation of the $N_S$-element transmitted modulation symbol vector representing the transmitter spatial processing (i.e., mapping to $N_T$ transmit antennas). $N_S$ is the number of parallel spatial streams, where $N_S \leq \min\{N_T, N_R\}$, and $N_f$ is the number of subcarriers used.

Generally, one or more spatial processing techniques may be employed in a MIMO-OFDM communication system. The various spatial processing techniques correspond to different mappings $T[s_k]$ of the signal symbol to the transmitting antennas. Spatial processing may be used to improve communication, e.g. improve the signal-to-noise of the channel or throughput of the channel. Examples of these include:

Direct mapping (DM): When DM is employed, the transmitter processing $T[s_k]$ is simply $Is_k$ where I is the $N_T \times N_T$ identity matrix. In this case $N_S$ is identical to $N_T$ and $N_R \geq N_T$. With this approach, each subcarrier (each element of the transmit symbol vector $s_k$) is mapped to its own send antenna.

Eigenvector steering (ES): When ES is used, the transmitter processing is given by $T[s_k] = \hat{V}_k s_k$, where the transmit steering matrix $\hat{V}_k$ for subcarrier k is derived from the single value decomposition (SVD) of $H_k$. Thus in an ES approach, $H_k = U_k S_k V_k^H$, where $U_k$ and $V_k$ are unitary matrices, and $S_k$ is a positive real-valued diagonal matrix containing the square root of the eigenvalues of $H_k$ in decreasing order. In particular, $\hat{V}_k$ consists of the first $N_S$ columns of $V_k$.

Spatial spreading (SS): With spatial spreading, the transmitter processing can be represented by $T[s_k] = W_k s_k$, where $W_k$ is a $N_T \times N_S$ spreading matrix whose columns are orthonormal. This matrix may for example be a single frequency-independent unitary matrix such as a Hadamard or Fourier matrix in combination with cyclic transmit diversity, so that the resulting spreading matrix is $$W_k = C_k \hat{W}$$

where $\hat{W}$ consists of the first $N_S$ columns of the Hadamard or Fourier matrix. To make $W_k$ a function of frequency, each transmit antenna is assigned a cyclic delay, represented by the matrix $C_k$, that introduces a linear phase shift. This cyclic transformation can be represented in the frequency domain by the $N_T \times N_T$ diagonal matrix $$C_k = \text{diag}\{1, e^{-j2\pi k \Delta_f \delta_1}, \ldots, e^{-j2\pi k \Delta_f \delta_{N_T-1}}\} \quad \text{(Eq. 2)}$$

where $\delta_{i_T}$ is the delay interval for transmit antenna $i_T$.

Apart from or in addition to the above techniques, other approaches including beamforming, space-time block-coding, or space-frequency block coding may also be utilized.

Initial Channel Estimation

Regardless of whether or which of the above techniques are employed, upon receipt of a signal, the receiver must separate and demodulate the $N_S$ data streams contained within the signal. In one embodiment, this is achieved by applying spatial equalization, though other techniques may be employed to separate the streams. The equalizer weights are computed based on an estimate of the effective channel as seen by the receiver. For the techniques described above, the effective channel is simply $H_k$ in the case of DM, $H_k \hat{V}_k$ in the case of ES, and $H_k W_k$ in the case of SS. The determination of the initial channel estimate used in the spatial equalization may be performed in the frequency domain, independently for each subcarrier k.

In some embodiments, an initial channel estimate is obtained using a training sequence. In such an embodiment, a transmitter sends a MIMO training sequence in which the spatial streams have been orthogonalized, either by application of an orthogonal cover matrix (as is the case in IEEE 802.11n), by employing tone interleaving (i.e., transmitting all the training symbols in each subcarrier on a single spatial stream), or some other approach. The receiver computes an estimate of the MIMO channel matrix coefficients (per subcarrier) by correlating the received symbols with the known training sequence, effectively removing the modulation. When a training sequence is used, the same spatial mapping is applied to the training sequence as will be applied to the data payload, so that the effective channel as observed by the receiver is the same for both. Thus the channel estimate computed using the training sequence may be applied to separate and demodulate data signals as well.

It should be noted that in systems such as IEEE 802.11n, an additional cyclic shift per data stream may be applied with both DM, ES, and SS transmission schemes to avoid unintentional beamforming effects. Similar to the per-antenna cyclic shifts mentioned above, this cyclic shift may be represented in the frequency domain by an $N_S \times N_S$ diagonal matrix $$\Theta_k = \text{diag}\left\{1, e^{-j2\pi k \Delta_f \delta'_1}, \ldots, e^{-j2\pi k \Delta_f \delta'_{N_S-1}}\right\} \quad \text{(Eq. 3)}$$

where $\delta_{i_s}'$ is the delay interval for stream $i_S$.

Generally, per-antenna and per-stream cyclic shifts result in reduced phase coherence across subcarriers. However, as long as the receiver has knowledge of what cyclic shifts were applied at the transmitter, they may be compensated for in computing the effective channel estimate. In the case of per-stream cyclic shifts, this is easily done in the frequency domain by multiplying the initial effective channel estimate by the complex conjugate of $\Theta_k$. To remove per-antenna cyclic shifts, the receiver must first undo the effects of the spatial mapping matrix $\hat{W}$ to separate the signal from each sending antenna. To do so, the receiver needs to know exactly what spatial mapping $\hat{W}$ was used at the sending end.

In some embodiments, once an initial channel estimate is obtained (either using a training sequence as discussed above, or by any other method), either a smoothing operation or a noise filtering operation may be applied to the initial channel estimate, thereby improving upon the quality of the initial channel estimate. In a typical embodiment, the receiver may incorporate cyclic shifts into the channel estimate after smoothing or noise filtering to maintain the same effective channel for both the received MIMO training sequence and the subsequent data payload.

Time Domain Maximum Likelihood Noise Filtering

Figure 3:
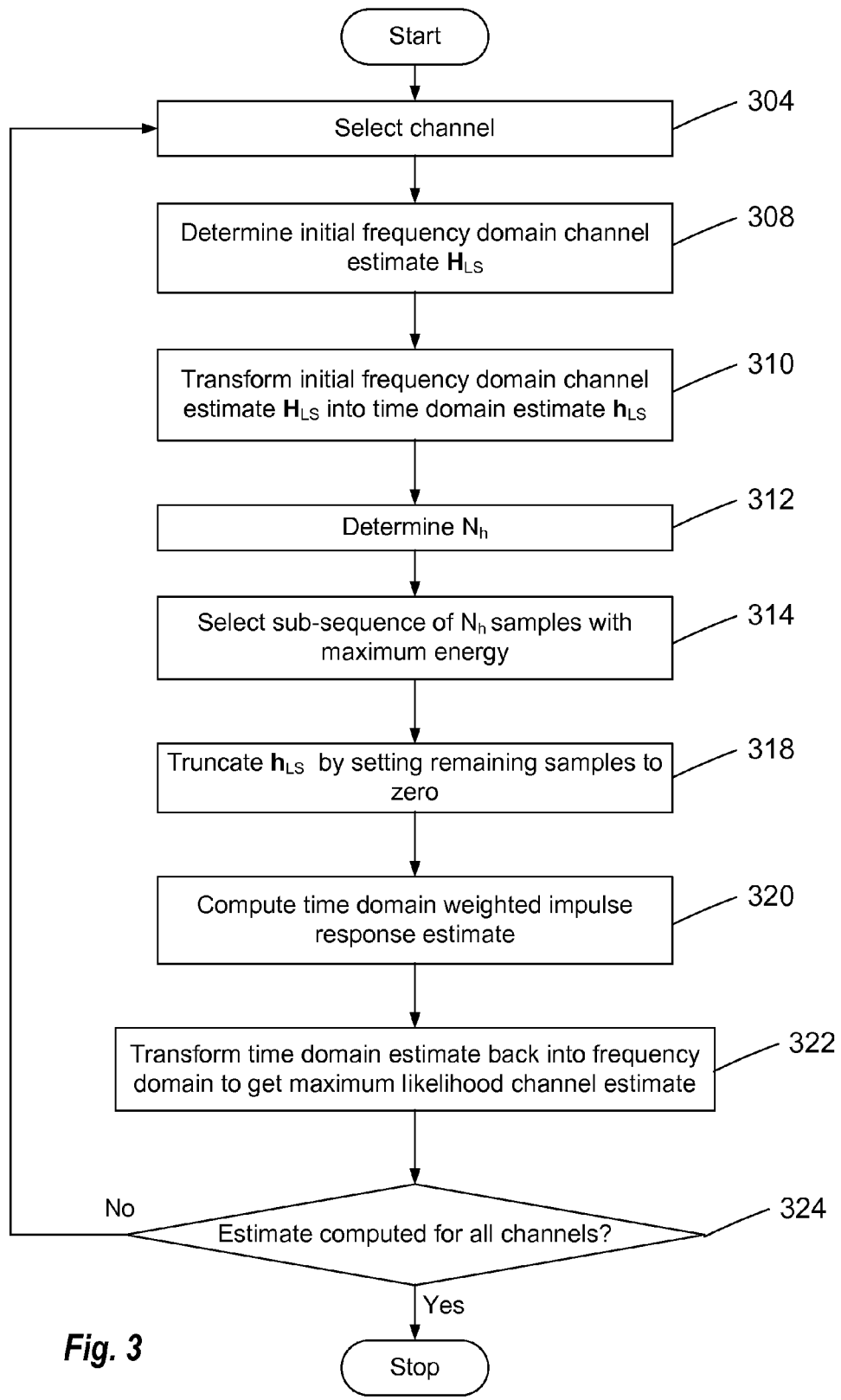
FIG. 3 is a flow chart of an exemplary method for computing a maximum likelihood channel estimate.

FIG. 3 shows a block diagram of an exemplary method of improving an initial channel estimate using maximum likelihood noise filtering. The procedure described with respect to noise filtering may be applied separately and independently to each of the $N_T N_R$ SISO channels between each pair of transmit and receive antennas (or $N_S N_R$ channels, if any spatial mapping of $N_S$ streams to $N_T$ transmit antennas such as ES or SS is used).

In the following discussion, for simplicity of notation, the subcarrier index k is dropped. In addition, bold capital letters denote frequency domain vectors and matrices, while bold lower case letters denote their time domain equivalents.

A frequency domain channel estimate $H_{LS}$ for a single SISO channel (i.e., a selected one of the $N_T N_R$ or $N_S N_R$ channels in a MIMO system) may be represented by $$H_{LS} = F \cdot [h \, 0]^T + N \quad \text{(Eq. 4)}$$

where F is an $N_f \times N_f$ Fourier matrix, and $h = [h_0 \, h_1 \ldots h_{N_h-1}]$ is the time domain impulse response for the selected channel. The time domain impulse response h is of duration $N_h$, where $N_h < N_p$, i.e., the impulse response is contained in the OFDM cyclic prefix of duration $N_p$. 0 is a row vector of zeroes of length $N_f - N_h$; the concatenated vector [h 0] is the time domain impulse response vector h filled out with zeroes to length $N_f$. N is an $N_f \times 1$ additive white Gaussian noise (AWGN) vector. N is a Gaussian random variable with zero mean and covariance $C_{NN}$; thus $H_{LS}$ is a Gaussian random variable with mean $F[h \, 0]^T$ and covariance $C_{NN}$.

The portion of $H_{LS}$ that corresponds to the limited duration impulse response may be referred to as the "signal part" of $H_{LS}$. The signal part is contained in the subspace spanned by the mean of $H_{LS}$. The signal-only and noise-only subspaces may therefore be separated as follows:

$$H_{LS} = [F_h F_n] \cdot [h \, 0]^T + N \quad \text{(Eq. 5)}$$

where $F_h$ and $F_n$ are discrete Fourier transform (DFT) matrices, fast Fourier Transform (FFT) matrices or other time-frequency transform matrices. $F_h$ and $F_n$ Are of size $N_f \times N_h$ and $N_f \times (N_f - N_h)$, respectively. The reduced space signal may be represented by $$r = F_h^\dagger \cdot H_{LS} = h + F_h^\dagger \cdot N = h + v \quad \text{(Eq. 6)}$$

where $F_h^\dagger$ denotes the Moore-Penrose pseudo-inverse of $F_h$ given by $F_h^\dagger = (F_h^H F_h)^{-1} F_h^H$. The random variable v is Gaussian with zero mean and covariance matrix $C_{vv} = F_h^H C_{NN} F_h$. Hence, the log-likelihood function for the reduced space signal is $$\log f(r) = -\log(\pi \det(C_{vv})) - (F_h^\dagger H_{LS} - h)^H C_{vv}^{-1} (F_h^\dagger H_{LS} - h). \quad \text{(Eq. 7)}$$

Maximization of the log-likelihood function with respect to h yields the maximum likelihood (ML) estimator for H:

$$H_{ML} = F_h F_h^\dagger \cdot H_{LS} = F_h (F_h^H F_h)^{-1} F_h^H \cdot H_{LS} \quad \text{(Eq. 8)}$$

The maximum likelihood channel estimate for a selected channel can be determined by separating the signal portion of $H_{LS}$ from the noise portion, and filtering out the nose components. Referring to FIG. 3, an exemplary method for achieving this is as follows.

Once a channel is selected (304), the initial frequency domain channel estimate $H_{LS}$ may be determined by any method (308), such as the training sequence method discussed above. In an exemplary embodiment, obtaining the frequency domain channel estimate (step 308) may include $H_{LS}$ compensating for per-stream cyclic shifts and, where any spatial mapping used, compensating for the spatial mapping and the per-antenna cyclic shifts.

In an exemplary embodiment, the initial frequency domain channel estimate into is transformed (310) into its time domain equivalent—the initial time domain impulse response estimate $h_{LS}$—by computing the inverse fast Fourier transform (IFFT) of $H_{LS}$:

$$h_{LS} = F^H \cdot H_{LS} \tag{Eq. 9}$$

In an exemplary embodiment, noise filtering is achieved by determining (314) the sub-sequence of $N_h$ samples that captures the maximum energy portion of the initial time domain impulse response estimate $h_{LS}$, where $N_h$ is the impulse response duration. The maximum-energy sub-sequence may be determined for fixed $N_h$ by positioning a window of length $N_h$ at different starting points in the $h_{LS}$ vector and selecting the window position that maximizes the energy within the window. Alternatively, the maximum-energy subsequence may be determined by selecting only those samples whose energy exceeds a threshold value. Additionally, the impulse response duration $N_h$ is not necessarily known a priori; in some embodiments, the value of $N_h$ must be selected or determined (312). Some ways of selecting or determining the value of $N_h$ are discussed further below.

Once the sub-sequence of the $N_h$ samples that captures the maximum energy portion of initial time domain impulse response estimate $h_{LS}$ is determined (314), $h_{LS}$ is truncated (318). In an embodiment, the initial time domain impulse response estimate $h_{LS}$ is truncated by setting to zero those $(N_f-N_h)$ samples that are not part of the maximum energy sub-sequence, effectively filtering out noise. Steps 308, 310, 312, 314, and 318 collectively perform the rightmost matrix-vector multiplication of the maximum likelihood estimator in Eq. 8, $$h_{max} = F_h^H \cdot H_{LS} \tag{Eq. 10}$$

Using the filtered (truncated) initial impulse response estimate $h_{max}$, the time domain weighted impulse response estimate may be computed (320) according to $$h_{ML} = (F_h^H F_h)^{-1} \cdot h_{max} \tag{Eq. 11}$$

Transforming $h_{ML}$ back into the frequency domain (322) yields the frequency domain maximum likelihood channel estimate $H_{ML}$ for the selected MIMO channel:

$$H_{ML} = F \cdot h_{ML} = F_h \cdot h_{ML} \tag{Eq. 12}$$

This procedure may be repeated for all the $N_T N_R$ transmit-receive antenna pairs (or $N_S N_R$ channels, if any spatial mapping is applied), to generate the complete maximum likelihood MIMO channel estimate for all channels (324).

In addition, as mentioned above, in some embodiments, the cyclic shifts may be incorporated into the channel estimate to maintain the same effective channel for both the received MIMO training sequence and the subsequent data payload.

As mentioned above, in some embodiments the impulse response duration $N_h$ is assigned a predefined value. Ideally the predefined value of $N_h$ is an acceptable trade-off between capturing the majority of the impulse response energy and filtering noise; if $N_h$ is too small, then the filtering process will throw away too many signal samples. If it is too large, however, the noise filtering will be ineffective.

In other embodiments, $N_h$ may be determined (312) via an algorithm. An exemplary embodiment of a method 312 for choosing an optimum $N_h$ from a set of predefined values is illustrated in the flow chart of FIG. 4. In the method illustrated in FIG. 4, the processor has in memory a set of M predefined values, $N_h \in \{w_1, \ldots, w_M\}$. The method illustrated in FIG. 4 determines the best choice of $N_h$ from this set, as well as the location of the maximum-energy window of size $N_h$ within the $N_f$ samples of the initial time domain impulse response estimate $h_{LS}$, given an estimate of the noise floor level, $N_0$.

Figure 4:
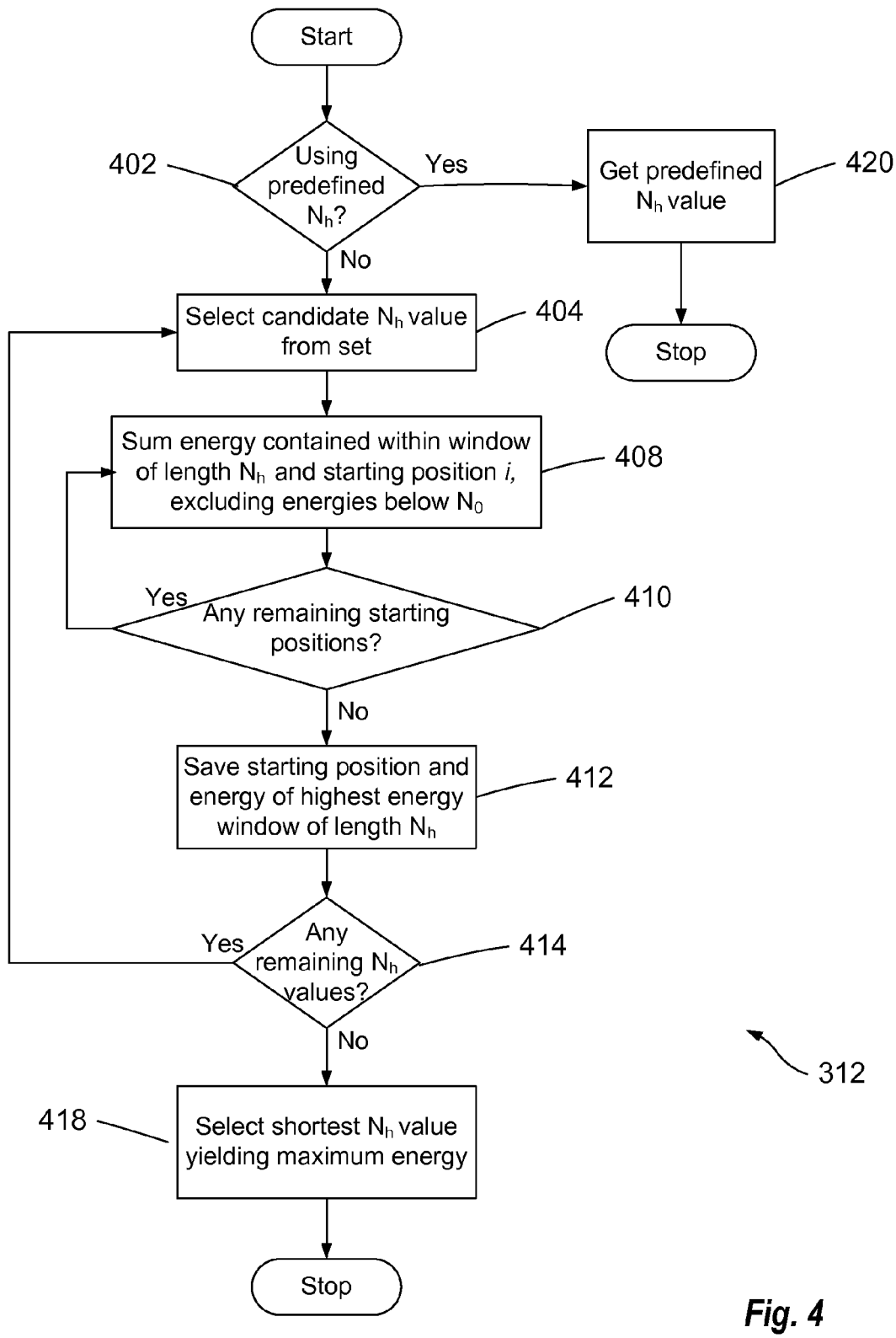
FIG. 4 is a flow chart of an exemplary method for selecting an impulse response duration $N_h$.

In the embodiment illustrated in FIG. 4, if a predefined $N_h$ is to be used (402), the method of selecting $N_h$ can be bypassed (420). Otherwise, the first candidate $N_h$ value, $w_0$, is selected (404). Then the sub-sequence of length $w_0$ having the maximum energy is determined as follows. A window of length $w_0$ is considered at each starting location in initial time domain impulse response estimate $h_{LS}$. For each starting position, the energy of all points in the window of length $w_0$ is summed (408, 412), excluding from the sum points whose energy does not exceed the threshold energy (the noise floor $N_0$). The starting position that yields the highest summed energy within the window of length $w_0$ is saved along with the corresponding energy (412). This is repeated for each candidate $N_h$ value in the set. Finally, the $N_h$ value having the maximum energy is selected (418) for use in computing the maximum likelihood channel response estimate. If more than one candidate $N_h$ value yields the maximum energy (or, alternatively, if more than one $N_h$ value exceeds a predefined maximum energy threshold), the shortest such candidate $N_h$ value is selected. The associated starting position determines which $(N_f-N_h)$ samples within the initial time domain impulse response estimate $h_{LS}$ are to set to zero in step 318 of FIG. 3.

The above-described improved channel estimation techniques may be implemented in a variety of ways. For example, these techniques may be implemented in hardware, software, or a combination thereof. For a hardware implementation, the processing units for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that include the instructions that may be implemented by one or more processors to perform the functions described herein. The instructions may be stored in memory units, e.g., memory 972 in FIG. 2, on a removable media, or the like that may be read and executed by one or more processors (e.g., controllers 970). The memory unit(s) may be implemented within the processor or external to the processor, in which case it can be communicatively coupled to the processor via various means as is known in the art.

Figure 5:
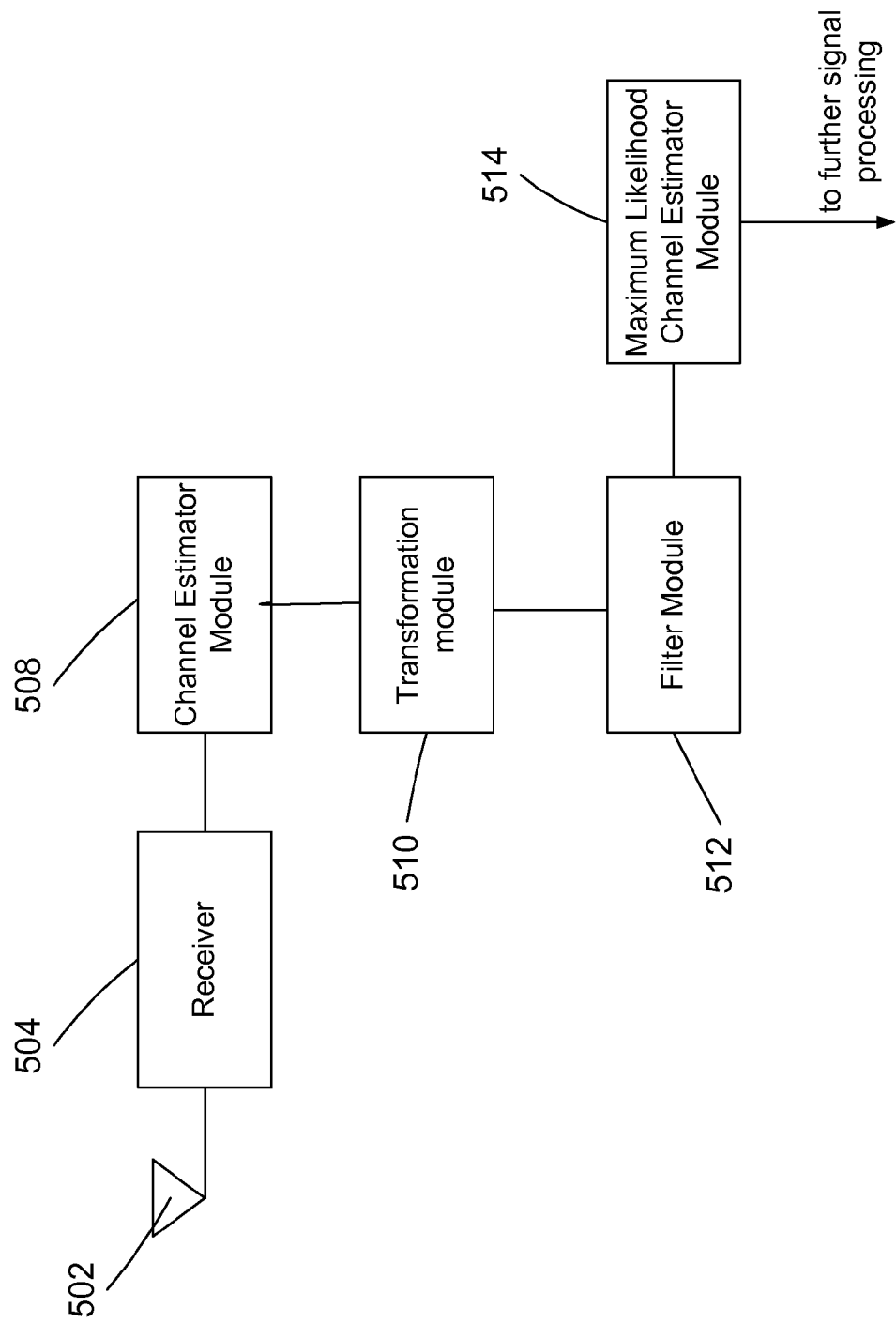
FIG. 5 is a block diagram of an exemplary system for computing a maximum likelihood channel estimate.

FIG. 5 shows a block diagram of an exemplary embodiment of a system designed to perform the improved channel estimation method described above. Each element of this block diagram may be implemented in hardware, software, or a combination thereof, such as the hardware and software components described in the previous paragraphs. In addition, modules shown separately in FIG. 5 may, in some embodiments, be combined into multi-purpose modules; likewise, each module in FIG. 5 may itself comprise one or sub-modules that perform portions of the described functions.

In an exemplary embodiment, the system includes an antenna 502, which may be a physical antenna or an antenna array, and may be one of a plurality of antennas in the MIMO system. The antenna 502 connects to a receiver module 504, which may amplify the received signal and perform any desired pre-processing. A channel estimator module 508 computes an initial frequency domain channel estimate $H_{LS}$ for the selected channel, for example by the training sequence method referenced above or by any other suitable method. A transformation module 510 transforms the initial frequency domain channel estimate $H_{LS}$ into the time domain to obtain the initial time domain impulse response estimate $h_{LS}$. A filter module 512 selects the portions of the initial time domain impulse response estimate $h_{LS}$ to be set to zero, as described above in connection with FIGS. 3 and 4, to generate the truncated impulse response estimate. Finally a maximum likelihood channel estimator module 514 uses the truncated initial impulse response estimate to compute the frequency domain maximum likelihood channel estimate $H_{ML}$ for the selected channel. The frequency domain maximum likelihood channel estimate $H_{ML}$ may then be passed to other processor modules for use in processing incoming data streams.

Frequency Domain Smoothing.

Figure 6:
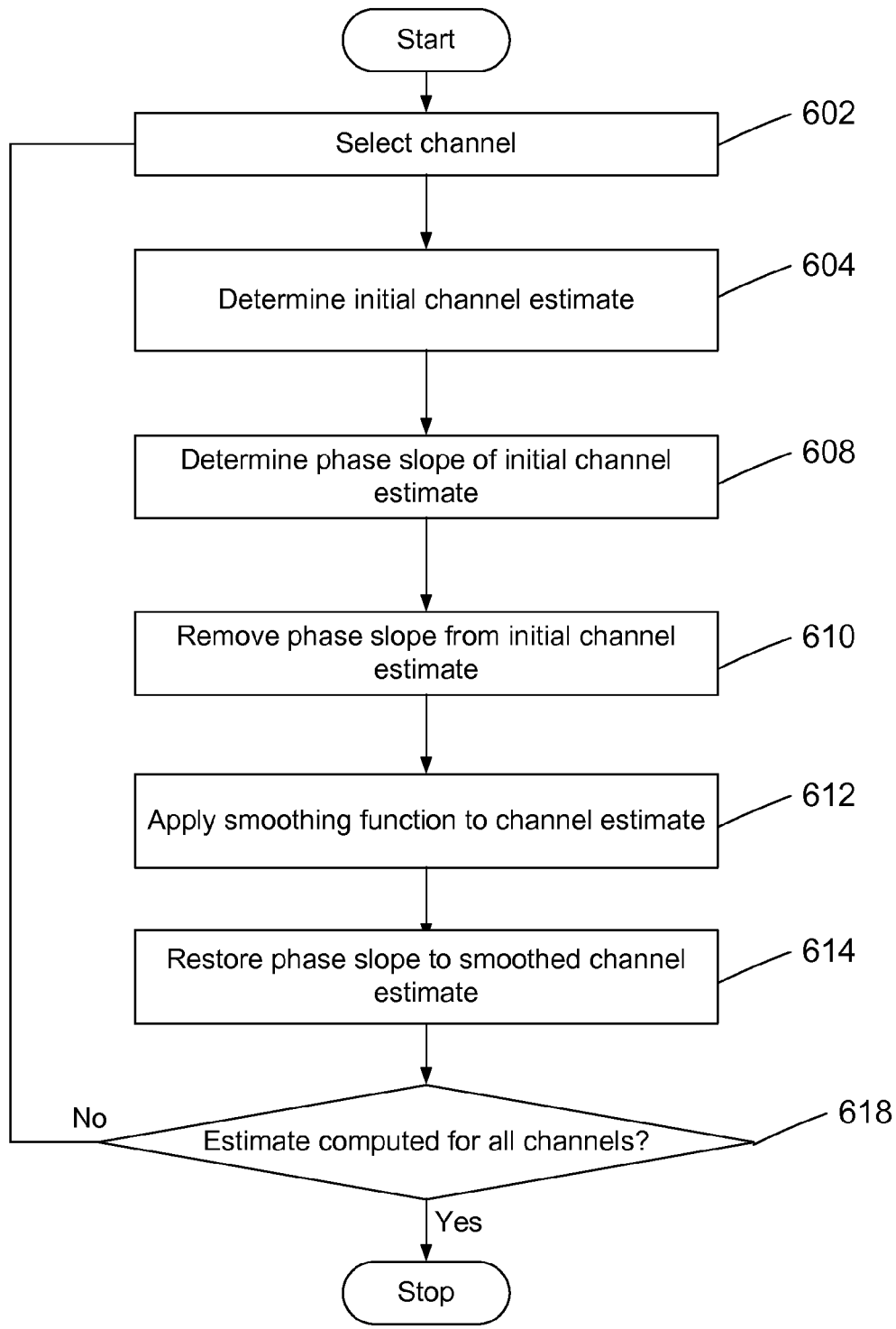
FIG. 6 is a flow chart of an exemplary method of computing a smoothed channel estimate.

FIG. 6 illustrates a flow chart for an exemplary embodiment of frequency domain smoothing, an alternative method for enhancing the initial channel estimate. This method operates on frequency domain samples. As in the time domain maximum likelihood noise filtering method discussed above, the frequency domain smoothing procedure may be applied separately and independently to each of the $N_T N_R$ SISO channels between each pair of transmit and receive antennas (or $N_S N_R$ channels, if any spatial mapping of $N_S$ streams to $N_T$ transmit antennas such as ES or SS is used).

Once a channel is selected (602), the initial frequency domain channel estimate $H_{LS}$ for the selected channel may be determined by any method (604), such as the training sequence method discussed above. In an exemplary embodiment, obtaining the initial frequency domain channel estimate $H_{LS}$ (step 604) may include compensating for per-stream cyclic shifts and, where any spatial mapping used, compensating for the spatial mapping and the per-antenna cyclic shifts.

Once the initial frequency domain channel estimate $H_{LS}$ is determined, the next step (608) is to estimate the average phase slope $\phi$ over the $N_f$ samples of $H_{LS}$:

$$P = \sum_{k=0}^{N_f-2} H_{LS}(k) \cdot H_{LS}^*(k+1) \quad \text{(Eq. 13)}$$

$$\varphi = \tan^{-1}(\text{Im}(P)/\text{Re}(P)) \quad \text{(Eq. 14)}$$

In an alternative embodiment, instead of computing the average phase slope over the single-channel initial channel estimate, $H_{LS}$, the phase slope may be averaged over all the $N_T N_R$ (or $N_S N_R$) SISO channels.

Once the average phase slope has been computed, it is removed (610) from the $N_f$ samples of the initial channel estimate $H_{LS}$:

$$H_\phi(k) = H_{LS}(k) \cdot e^{-j\phi k} \quad \text{(Eq. 15)}$$

Having removed the average phase slope, a smoothed channel estimate may be obtained (612) by taking a weighted average of some number N adjacent samples; i.e., replacing each sample in the initial channel estimate $H_{LS}$ by the weighted average of that sample with some number of samples to either side of it, reducing the effective noise in the channel estimate. In one embodiment, the following smoothing function is used:

$$H_{sm,\varphi}(k) = A_{-\frac{N+1}{2}} \cdot H_\varphi\left(k - \left(\frac{N-1}{2}\right)\right) + \quad \text{(Eq. 16)}$$
$$\ldots + A_0 \cdot H_\varphi(0) + \ldots + A_{\frac{N-1}{2}} \cdot H_\varphi\left(k + \left(\frac{N-1}{2}\right)\right)$$

$$k = \frac{N-1}{2}, \ldots, N_f - \left(\frac{N-1}{2}\right) - 1 \quad \text{(Eq. 17)}$$

where $\{A_i\}$ denote the weighting coefficients. In an exemplary embodiment, N=3, $A_{-1}$=0.25, $A_0$=0.5, and $A_1$=0.25. The end points (k=0, . . . (N−1)/2, and k=$N_f$−(N+1)/2, . . . $N_f$−1) require a slight modification of the above formula, because there are no samples to include average before (at the lower end) or after (at the higher end) the center sample of the weighted average. This can be addressed by, for example, reducing the number of samples in the weighted average as the end points are approached. In an exemplary embodiment, when the center sample gets closer than (N−1)/2 away from either endpoint, the weighted average can be adjusted to use some smaller number N' samples, where N'<N. For example, one modification of the weighted average would be to use $$N' = k + 1 + \left(\frac{N-1}{2}\right) \text{ when } k < (N-1)/2, \text{ and} \quad \text{(Eq. 18)}$$

$$N' = N_f - k + \left(\frac{N-1}{2}\right) \quad \text{(Eq. 19)}$$

when k>$N_f$−(N−1)/2−1. When a number N'<N samples is used near the endpoints of the channel estimate, the N' weighting coefficients $A_i$ must also be adjusted so that their sum remains 1.

Finally, when the smoothing is complete, the phase slope removed in step 610 may be multiplied back in at step 614 to obtain the smoothed channel estimate $H_{sm}$ of the selected channel:

$$H_{sm}(k) = H_{sm,\phi}(k) \cdot e^{j\phi k} \quad \text{(Eq. 20)}$$

In an exemplary embodiment, this procedure is repeated (618) for all the $N_T N_R$ transmit-receive antenna pairs, generating the complete smoothed MIMO channel estimate.

In some embodiments, the receiver also re-inserts any cyclic shifts into the channel estimate to maintain the same effective channel for both the received MIMO training sequence and the subsequent data payload.

When applying frequency domain smoothing as described above to MIMO training in embodiments in which eigenvector steering is employed, it may be desirable to enforce some type of phase continuity between subcarriers at the transmitter by modifying the transmitter steering matrix $V_k$. This maintains the frequency coherence of the steered channel (HV). Put another way, it ensures the accuracy of the assumption of Eqs. 13 and 14 that the phase variation from sample to sample is smooth and approximately linear. Eigenvectors are phase shift invariant so the modified matrix $\tilde{V}_k$ remains an eigenvector matrix. Two exemplary alternatives for enforcing phase continuity at the transmitter are phase continuous steering and positive real first element steering. For phase continuous steering, the transmitter steering matrix $V_k$ may be modified as follows:

$$\tilde{V}_k = V_k * \text{diag}(\exp(j*\text{angle}(\text{diag}(V_k^H V_{k-1})))). \quad \text{(Eq. 21)}$$

This computes the phase difference in the steering matrix $V_k$ for a pair of neighboring samples, and adjusts the steering matrix accordingly, so as to produce a modified steering matrix $\tilde{V}_k$ having phase continuity. Alternatively, the following modification may be applied to $V_k$ to achieve positive real first element steering:

$$\tilde{V}_k = V_k * \text{diag}(\exp(-j*\text{angle}(V_k(1,:))))). \quad \text{(Eq. 22)}$$

As with the maximum likelihood channel estimate technique, the frequency domain smoothing channel estimation techniques described herein may likewise be implemented in a variety of ways. For example, these techniques may be implemented in hardware, software, or a combination thereof. For a hardware implementation, the processing units for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that include the instructions that may be implemented by one or more processors to perform the functions described herein. The instructions may be stored in memory units, e.g., memory 972 in FIG. 2, on a removable media, or the like that may be read and executed by one or more processors (e.g., controllers 970). The memory unit(s) may be implemented within the processor or external to the processor, in which case it can be communicatively coupled to the processor via various means as is known in the art.

Figure 7:
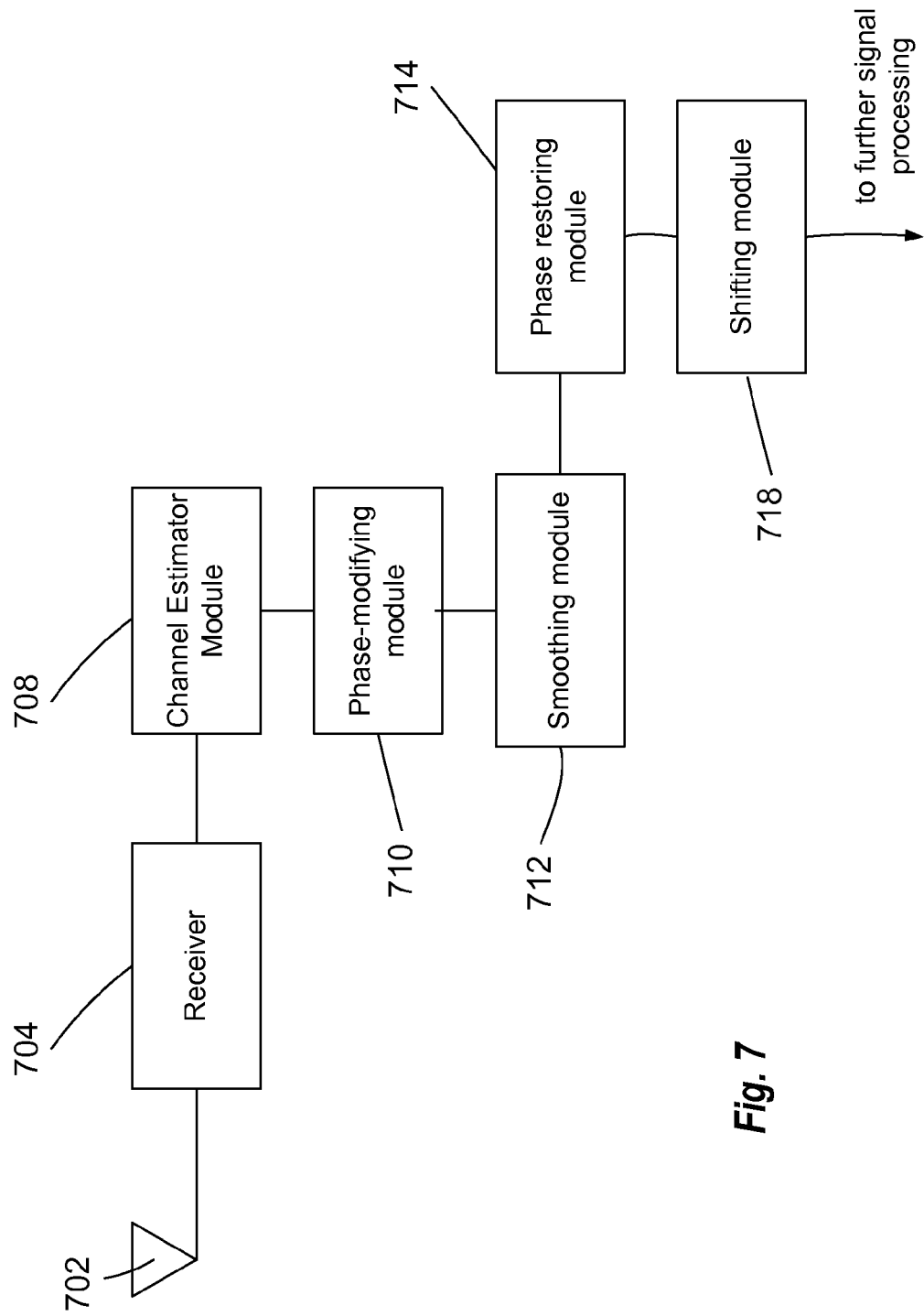
FIG. 7 is a block diagram of an exemplary system for computing a smoothed channel estimate.

FIG. 7 shows a block diagram of an exemplary embodiment of a system designed to perform the improved channel estimation method described above. Each element of this block diagram may be implemented in hardware, software, or a combination thereof, such as the hardware and software components described in the previous paragraphs. In addition, modules shown separately in FIG. 7 may, in some embodiments, be combined into multi-purpose modules; likewise, each module in FIG. 7 may itself comprise one or sub-modules that perform portions of the described functions.

In an exemplary embodiment, the system includes an antenna 702, which may be a physical antenna or an antenna array, and may be one of a plurality of antennas in the MIMO system. The antenna 702 connects to a receiver module 704, which may amplify the received signal and perform any desired pre-processing. A channel estimator module 708 computes an initial frequency domain channel estimate $H_{LS}$ for the selected channel, for example by the training sequence method referenced above or by any other suitable method.

A phase-modifying module 710 computes the average phase as discussed above in connection with FIG. 6 and removes it from the initial frequency domain channel estimate. A smoothing module 712 applies a smoothing function to the channel estimate, also as discussed above in connection with FIG. 6. A phase restoring module 714 restores the phase slope to the channel estimate. Finally, a shifting module 718 restores any cyclic shifts in embodiments in which such shifts are employed. The smoothed, shifted channel estimate can then be passed to other processor modules for use in processing incoming data streams.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the scope of the invention. The present invention is intended to be consistent with the principles and novel features disclosed herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the scope of the appended claims.

We claim:

1. A method of enhanced channel estimation in a communication system, the method comprising:
   selecting a selected channel from among one or more channels in the communication system;
   determining, for the selected channel, an initial channel estimate comprising a sequence of frequency-domain samples;
   determining a phase slope of the initial channel estimate;
   generating a flat-phase channel estimate by removing the phase slope from the initial channel estimate; and
   generating an enhanced channel estimate for the selected channel by applying a smoothing function to the flat-phase channel estimate.

2. The method of claim 1, wherein determining the phase slope of the initial channel estimate comprises determining an average phase slope over the sequence of frequency-domain samples in the initial channel estimate.

3. The method of claim 1, wherein determining the phase slope of the initial channel estimate comprises determining an average phase slope for every channel in the communication system, each channel comprising a sending antenna and a receiving antenna.

4. The method of claim 1, wherein applying a smoothing function to the flat-phase channel estimate further comprises computing a weighted average of a predetermined number of adjacent samples from the sequence of frequency-domain samples.

5. The method of claim 4, wherein the weighted average is computed according to the formula $$H_{sm,\varphi}(k) = A_{-\frac{N+1}{2}} \cdot H_\varphi\left(k - \left(\frac{N-1}{2}\right)\right) +$$
$$\ldots + A_0 \cdot H_\varphi(0) + \ldots + A_{\frac{N-1}{2}} \cdot H_\varphi\left(k + \left(\frac{N-1}{2}\right)\right)$$
$$k = \frac{N-1}{2}, \ldots, N_f - \left(\frac{N-1}{2}\right) - 1$$

wherein $H_\varphi(k)$ is a $k^{th}$ sample of the sequence of frequency-domain samples in the flat-phase channel estimate, $H_{sm,\varphi}(k)$ is the weighted average value corresponding to the $k^{th}$ sample, N is the predetermined number of samples in the weighted average, $N_f$ is the total number of samples in the flat-phase channel estimate, and $A_i$ are weighting coefficients.

6. The method of claim 5, wherein N=3, $A_{-1}$=0.25, $A_0$=0.5, and $A_1$=0.25.

7. The method of claim 1, wherein generating an enhanced channel estimate further comprises restoring the phase slope to the enhanced channel estimate.

8. The method of claim 7, further comprising inserting a cyclic shift into the enhanced channel estimate.

9. The method of claim 1, wherein the communication system includes one or more sending antennas or receiving antennas.

10. The method of claim 9, wherein each channel in the communication system corresponds to a send-receive pair of one of the sending antennas and one of the receiving antennas, the method further comprising repeating, for each channel in the communication system, all steps from selecting a selected channel to generating an enhanced channel estimate for the selected channel.

11. The method of claim 9, wherein each channel in the communication system corresponds to a stream-receive pair of one of a plurality of data streams and one of the receiving antennas, the method further comprising repeating, for each channel in the communication system, all steps from selecting a selected channel to generating an enhanced channel estimate for the selected channel.

12. The method of claim 1, further comprising transmitting the selected channel using at least one of phase continuous steering or positive first element steering.

13. An apparatus for enhancing channel estimation in a communication system, the apparatus comprising:
 a receiving antenna;
 a receiver adapted to receive a signal from the receiving antenna;
 an initial channel estimator module adapted to select a channel corresponding to the receiving antenna and one of at least one sending antennas and to determine, for the selected channel, an initial channel estimate based upon the received signal, the initial channel estimate comprising a sequence of frequency-domain samples;
 a phase-modifying module adapted to determine a phase slope of the initial channel estimate and to generate a flat-phase channel estimate by removing the phase slope from the initial channel estimate; and
 a smoothing module adapted to generate an enhanced channel estimate for the selected channel by applying a smoothing function to the flat-phase channel estimate.

14. The apparatus of claim 13, wherein the phase-modifying module is further adapted to determine the phase slope of the initial channel estimate by determining an average phase slope over the sequence of frequency-domain samples in the initial channel estimate.

15. The apparatus of claim 13, wherein the phase-modifying module is further adapted to determine the phase slope of the initial channel estimate by determining an average phase slope for every channel in the communication system, each channel comprising a pair of one of the at least one sending antennas and one of at least one receiving antennas.

16. The apparatus of claim 13, wherein the smoothing module is further adapted to compute a weighted average of a predetermined number of adjacent samples from the sequence of frequency-domain samples.

17. The apparatus of claim 16, wherein the weighted average is computed according to the formulae $$H_{sm,\varphi}(k) = A_{\frac{-N+1}{2}} \cdot H_\varphi\left(k - \left(\frac{N-1}{2}\right)\right) + \ldots + A_0 \cdot H_\varphi(0) + \ldots + A_{\frac{N-1}{2}} \cdot H_\varphi\left(k + \left(\frac{N-1}{2}\right)\right)$$

$$k = \frac{N-1}{2}, \ldots, N_f - \left(\frac{N-1}{2}\right) - 1$$

wherein $H_\varphi(k)$ is a $k^{th}$ sample of the sequence of frequency-domain samples in the flat-phase channel estimate, $H_{sm,\varphi}(k)$ is the weighted average value corresponding to the $k^{th}$ sample, N is the predetermined number of samples in the weighted average, $N_f$ is the total number of samples in the flat-phase channel estimate, and $A_i$ are weighting coefficients.

18. The apparatus of claim 17, wherein N=3, $A_{-1}$=0.25, $A_0$=0.5, and $A_1$=0.25.

19. The apparatus of claim 13, further comprising a phase restoring module adapted to restore the phase slope to the enhanced channel estimate.

20. The apparatus of claim 19, further comprising a shifting module adapted to insert a cyclic shift into the enhanced channel estimate.

21. The apparatus of claim 13, wherein the receiving antenna is one of a plurality of receiving antennas.

22. The apparatus of claim 21, wherein each channel in the communication system corresponds to a send-receive pair of a sending antenna and the receiving antenna.

23. The apparatus of claim 21, wherein each channel in the communication system corresponds to a stream-receive pair of a data stream and the receiving antenna.

24. The apparatus of claim 13, further comprising: a transmitter transmitting the selected channel using at least one of phase continuous steering or positive first element steering.

25. A machine-readable medium carrying instructions for carrying out a method of enhanced channel estimation in a communication system, the method comprising:
 selecting a selected channel from among one or more channels in the communication system;
 determining, for the selected channel, an initial channel estimate comprising a sequence of frequency-domain samples;
 determining a phase slope of the initial channel estimate;
 generating a flat-phase channel estimate by removing the phase slope from the initial channel estimate; and
 generating an enhanced channel estimate for the selected channel by applying a smoothing function to the flat-phase channel estimate.

26. The machine-readable medium of claim 25, wherein determining the phase slope of the initial channel estimate comprises determining an average phase slope over the sequence of frequency-domain samples in the initial channel estimate.

27. The machine-readable medium of claim 25, wherein determining the phase slope of the initial channel estimate comprises determining an average phase slope for every channel in the communication system, each channel comprising a sending antenna and a receiving antenna.

28. The machine-readable medium of claim 25, wherein applying a smoothing function to the flat-phase channel estimate further comprises computing a weighted average of a predetermined number of adjacent samples from the sequence of samples.

29. The machine-readable medium of claim 28, wherein the weighted average is computed according to the formulae $$H_{sm,\varphi}(k) = A_{\frac{-N+1}{2}} \cdot H_\varphi\left(k - \left(\frac{N-1}{2}\right)\right) + \ldots + A_0 \cdot H_\varphi(0) + \ldots + A_{\frac{N-1}{2}} \cdot H_\varphi\left(k + \left(\frac{N-1}{2}\right)\right)$$

$$k = \frac{N-1}{2}, \ldots, N_f - \left(\frac{N-1}{2}\right) - 1$$

wherein $H_\phi(k)$ is a $k^{th}$ sample of the sequence of frequency-domain samples in the flat-phase channel estimate, $H_{sm,\phi}(k)$ is the weighted average value corresponding to the $k^{th}$ sample, N is the predetermined number of samples in the weighted average, $N_f$ is the total number of samples in the flat-phase channel estimate, and $A_i$ are weighting coefficients.

30. The machine-readable medium of claim 29, wherein $N=3$, $A_{-1}=0.25$, $A_0=0.5$, and $A_1=0.25$.

31. The machine-readable medium of claim 25, wherein generating an enhanced channel estimate further comprises restoring the phase slope to the enhanced channel estimate.

32. The machine-readable medium of claim 31, wherein the method further comprises inserting a cyclic shift into the enhanced channel estimate.

33. The machine-readable medium of claim 25, wherein the communication system includes one or more sending antennas.

34. The machine-readable medium of claim 33, wherein the communication system includes one or more receiving antennas.

35. The machine-readable medium of claim 34, wherein each channel in the communication system corresponds to a send-receive pair of one of the sending antennas and one of the receiving antennas, and wherein the method further comprises repeating, for each channel in the communication system, all steps from selecting a selected channel to generating an enhanced channel estimate for the selected channel.

36. The machine readable medium of claim 34, wherein each channel in the communication system corresponds to a stream-receive pair of one of a plurality of data streams and one of the receiving antennas, and wherein the method further comprises repeating, for each channel in the communication system, all steps from selecting a selected channel to generating an enhanced channel estimate for the selected channel.

37. The machine readable medium of claim 25, further comprising: transmitting the selected channel using phase continuous steering or positive first element steering.

38. In a wireless communication system comprising wireless devices configured to communication with at least one other wireless device, an article of manufacture comprising:
   a receiver adapted to receive a signal from a receiving antenna;
   an initial channel estimator module adapted to select a channel from among one or more multiple data streams, said selected channel corresponding to the receiving antenna and at least one sending antenna;
   said initial channel estimator further adapted to determine, for the selected channel, an initial channel estimate based upon the received signal, the initial channel estimate comprising a sequence of frequency-domain samples;
   a phase-modifying module adapted to determine a phase slope of the initial channel estimate and to generate a flat-phase channel estimate by removing the phase slope from the initial channel estimate; and
   a smoothing module adapted to generate an enhanced channel estimate for the selected channel by applying a smoothing function to the flat-phase channel estimate.

39. The article of manufacture of claim 38, wherein the phase-modifying module is further adapted to determine the phase slope of the initial channel estimate by determining an average phase slope over the sequence of frequency-domain samples in the initial channel estimate.

40. The article of manufacture of claim 38, wherein the phase-modifying module is further adapted to determine the phase slope of the initial channel estimate by determining an average phase slope for every channel in the communication system, each channel comprising a pair of one of the at least one sending antennas and one of at least one receiving antennas.

* * * * *